No. 671,240. Patented Apr. 2, 1901.
F. SHUMAN.
PROCESS OF EXTINGUISHING FIRES.
(Application filed Oct. 13, 1900.)
(No Model.)

Witnesses:—
Frank F. A. Graham.

Inventor:
Frank Shuman
by his Attorneys

UNITED STATES PATENT OFFICE.

FRANK SHUMAN, OF PHILADELPHIA, PENNSYLVANIA.

PROCESS OF EXTINGUISHING FIRES.

SPECIFICATION forming part of Letters Patent No. 671,240, dated April 2, 1901.

Application filed October 13, 1900. Serial No. 32,990. (No model.)

*To all whom it may concern:*

Be it known that I, FRANK SHUMAN, a citizen of the United States, residing in Philadelphia, Pennsylvania, have invented certain Improvements in Processes of Extinguishing Fires, of which the following is a specification.

My invention consists of a novel process of extinguishing fires in vessels containing inflammable liquids.

The object of my invention is to extinguish the fire by generating within the vessel containing the oil or other fluid an air-excluding non-combustible gas in such a quantity as to envelop or cover the entire surface of the oil with gas, thus excluding the air and extinguishing the fire by depriving it of its oxygen.

Figure 1:
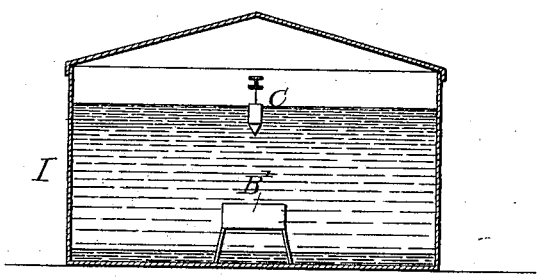
Figure 2:
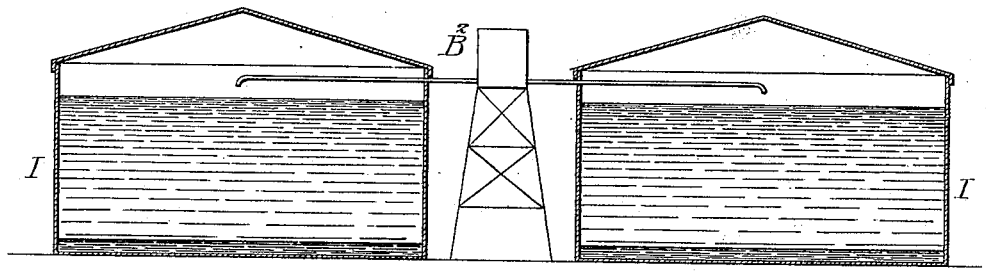
Figure 3:
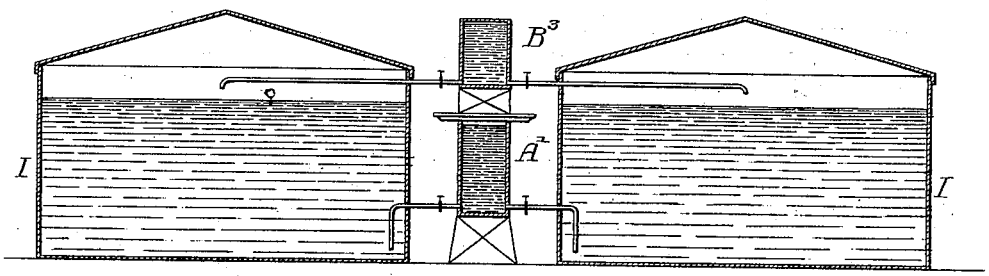

In the accompanying drawings, Figure 1 is a sectional diagram view illustrating one method of carrying out my invention in a liquid-storage vessel. Figs. 2 and 3 are views showing modified forms of apparatus which may be used in carrying out my invention, and Fig. 4 is a view of a modification of a detail of the invention.

The drawings are simply diagram views to illustrate the method I prefer to employ in carrying out my process.

Referring in the first instance to Fig. 1, the container I is in the form of an oil-tank, and in the bottom of this container is a carbonate, preferably in solution, which may be carbonate of soda, and mounted above the carbonate is a vessel B', containing any suitable acid, such as sulfuric acid, while directly above the vessel B' and above the surface of the oil or other liquid in the tank is a weight C, which may be pointed at its lower end. This weight is suspended from a beam or other suitable support by means of a fusible wire or cord, which will be burned by the flame as soon as the oil or other liquid catches fire. The carbonate solution being heavier than the oil will naturally remain at the bottom of the tank, as shown in Fig. 2. As soon as the weight is detached it will fall onto the vessel B', and this vessel being made of material that will not sustain the weight it will be penetrated, allowing the sulfuric acid, which is also heavier than the oil, to come at once into contact with the carbonate solution at the bottom of the tank. Hence carbonic-acid gas will be immediately generated, and as this gas is lighter than the oil it will at once pass through the entire body of the oil and will, in effect, lift the flame from the surface of the oil. The flame will consequently be extinguished, as there is nothing to feed it, the body of carbonic-acid gas remaining between the flame and the surface of the oil.

Figure 4:
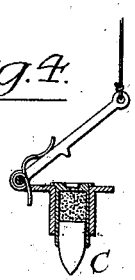

I may use in some cases, as shown in Fig. 4, an explosive cartridge and so arrange a hammer or trigger that it can be released on the burning of a fusible connection, so that the bullet will penetrate the reservoir. This method would also give an oral alarm, which is desirable.

While I have shown in Fig. 1 automatic means for releasing the acid, the latter may be released in any suitable manner.

In some instances the acid may be stored in a vessel $B^2$, outside of the storage-tank for the oil, as shown in Fig. 2, this form being preferable where a number of tanks are grouped together. In some instances also the acid and carbonate solution may be stored outside of the oil-tank in storage-tanks $B^3$ and A', as shown in Fig. 3, and the valves may be either automatic or hand-operated, as desired.

It should be understood that in practice I may distribute the acid throughout the entire body of the soda solution by pipes or equivalent means, or there may be several acid-pipes leading into the oil-tank at different points.

The tanks when once provided with the proper solution are protected indefinitely without any expense due to deterioration and would only have to be recharged in the event of the solution having been used to put out a fire.

The solutions are entirely harmless to the tank or oil. In fact, the carbonate solution will effectually prevent leakage of oil through the bottom of the tank and will be a substitute for the water which is now generally used in oil-tanks for this purpose.

In regard to the thickness of the layer of oxygen-excluding gas required to be thoroughly effective I would say that it varies with the size of the oil-tank. In a small fifty-gallon tank a half-inch layer of gas has proved sufficient, and in the case of a tank one hundred feet in diameter I estimate that a layer of gas twelve inches in thickness would be required. In my experiments I have used a tank holding about fifty gallons, with one pound of bicarbonate of soda dissolved in about one-half a gallon of water. This was placed in the bottom of the oil-tank and when the oil in the tank was on fire one-half pound of sixty-six per cent. sulfuric acid was discharged into the tank. The acid immediately descended to the bottom of the tank and combined with the soda solution, forming sulfate of soda and liberating the carbonic-acid gas. The carbonic-acid gas arose at once to the top of the oil and interposed itself between the oil and the air on account of its gravity, and thus extinguished the fire.

I may use instead of bicarbonate of soda carbonate of soda, carbonate of lime, sulfite of soda, or other equivalent chemical holding in combination carbonic-acid gas, sulfurous-acid gas, or other fire-extinguishing gas which can be liberated by the addition at the proper time of a suitable acid. I prefer bicarbonate of soda, however, not only on account of its cheapness, but also on account of the large amount of carbonic acid it contains.

I may use in place of sulfuric acid hydrochloric or acetic acid; but I prefer sulfuric acid on account of its strength, cheapness, and the heat it produces, as this will aid in the quick evolution of the gas in cold weather. In some instances I may use sulfurous-acid gas, liberated from sulfite solutions on account of its gravity.

Instead of the carbonate solution being loose in the bottom of the oil-tank it may be contained in a suitable receptacle, which can be so arranged that when the acid is combined with the bicarbonate gas will pass from the receptacle to the surface of the oil.

Instead of using the carbonate in solution I may use it in the granulated form, or I may use oyster-shells; but in either case when it is used in an oil-tank or other oil-container I preferably protect it by a body of water, so as to prevent the oil from coating the particles and preventing the rapid formation of gas when required.

I do not claim in this application, broadly, the process of extinguishing fires in vessels or other containers which consists in generating a non-combustible gas within the vessel in which the fire originates and in such quantities as to immediately displace the air and exclude it from the burning material in the chamber or compartment, as this forms the subject of a separate application filed January 9, 1900, Serial No. 866.

I claim as my invention—

1. The process herein described of extinguishing oil or other liquid fires, said process consisting in mixing a carbonate or carbonate solution and an acid below the surface of the oil or other liquid, allowing the gas evolved to pass to the surface of the liquid causing it to collect thereon, thus excluding the air from the oil or other liquid and extinguishing the fire, substantially as described.

2. The process herein described of extinguishing oil or other liquid fires, said process consisting in mixing a carbonate or carbonate solution and an acid in the bottom of the tank below the level of the oil or other liquid, allowing the gas evolved to pass through the body of oil and causing it to collect on the surface of the oil or liquid, thus excluding the air from the liquid and extinguishing the fire, substantially as described.

3. The process herein described of extinguishing oil or other inflammable liquid fires, the same consisting in locating a carbonate or carbonate solution directly under the body of oil or other inflammable liquid and discharging into the same a sufficient quantity of acid to liberate the carbonic-acid gas contained therein, which will rise through the oil or other liquid, collect on the surface of the same, and exclude the air from the surface of the oil so as to extinguish the fire, substantially as described.

In testimony whereof I have signed my name to this specification in the presence of two subscribing witnesses.

FRANK SHUMAN.

Witnesses:
WILL. A. BARR,
JOS. H. KLEIN.